United States Patent [19]

White

[11] Patent Number: 4,519,534
[45] Date of Patent: May 28, 1985

[54] PIN INSERTING MACHINE

[76] Inventor: William P. White, c/o Mechanical Applications, Inc., Wiscasset, Me. 04578

[21] Appl. No.: 519,135

[22] Filed: Aug. 1, 1983

[51] Int. Cl.³ .......................... B25C 5/02; B25C 5/06
[52] U.S. Cl. .................................. 227/117; 227/118; 227/148; 227/149; 227/142; 29/739
[58] Field of Search .................. 198/406, 409; 227/43, 227/142, 148, 149, 118, 105, 106, 117; 29/739

[56] References Cited

U.S. PATENT DOCUMENTS

| 2,510,137 | 6/1950 | Post | 227/118 |
|---|---|---|---|
| 3,302,274 | 2/1967 | Stoltz | 29/739 X |
| 3,668,760 | 6/1972 | Biederman et al. | 29/739 X |
| 3,713,197 | 1/1973 | Crump | 227/149 |
| 3,765,075 | 10/1973 | Olney, Jr. et al. | 29/739 X |
| 3,982,679 | 9/1976 | White, Jr. | 227/116 |
| 4,333,233 | 6/1982 | Dodson et al. | 29/845 |
| 4,385,719 | 5/1983 | Erskine | 29/739 X |

FOREIGN PATENT DOCUMENTS 1962124  6/1971  German Democratic Rep. ... 29/739

Primary Examiner—Paul A. Bell
Assistant Examiner—Taylor J. Ross
Attorney, Agent, or Firm—C. Yardley Chittick

[57] ABSTRACT

A machine for driving a pin into a hole in a work piece. The pins are fed by gravity in a continuous succession from a pin supply to a passage extending through a pin receiving rotor. With a pin in the rotor, the rotor is turned through a selected angle to bring the pin and the passage through the rotor into alignment with a pin driving punch. Upon actuation of the punch, the pin is driven from the rotor into a passage in an adjacent aligned sliding pin guide. Movement of the pin through the pin guide temporarily ceases when the pin encounters a resilient stop. Continued movement of the punch then moves the pin guide and the pin therein until the nose of the pin guide engages the work piece. The punch, continuing to move through the passage in the now stationary pin guide, drives the pin past the resilient stop and into the aligned hole in the work piece. Upon withdrawal of the punch, the pin guide aided by a spring returns to it original position adjacent the rotor. When the punch has cleared the rotor, the rotor is then rotated back to its original position ready to receive the next pin. The operation is then repeated to drive the next pin into another hole in the work piece which has been positioned to be aligned with the punch and the passage through the pin guide.

4 Claims, 9 Drawing Figures

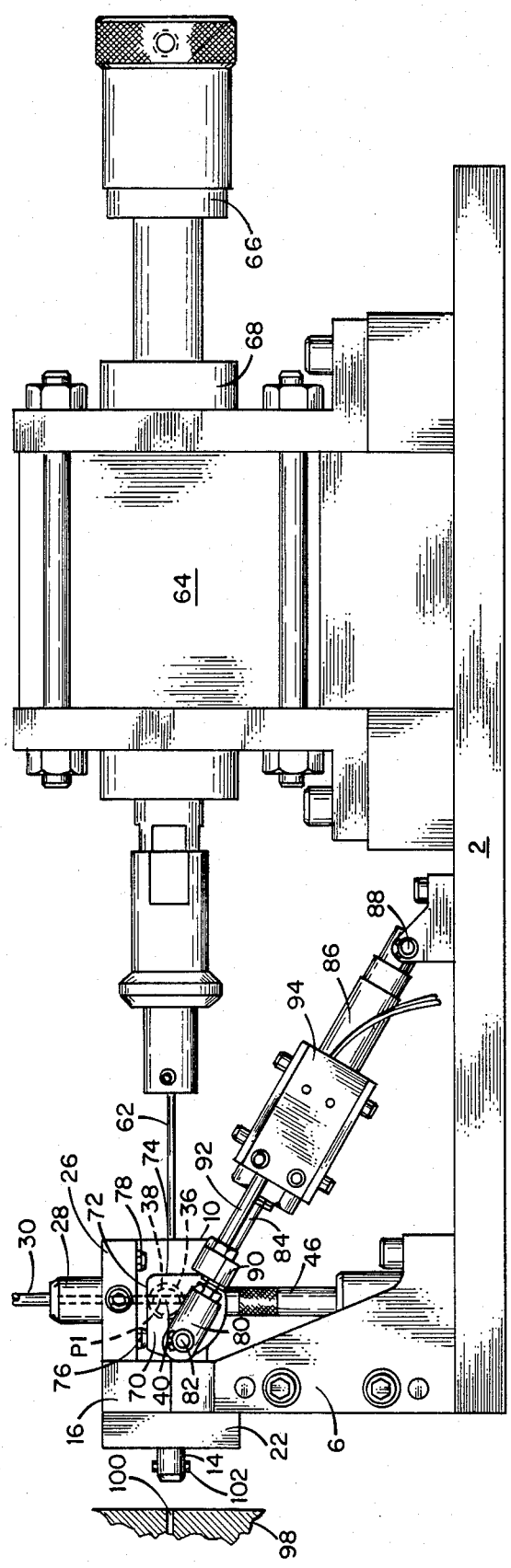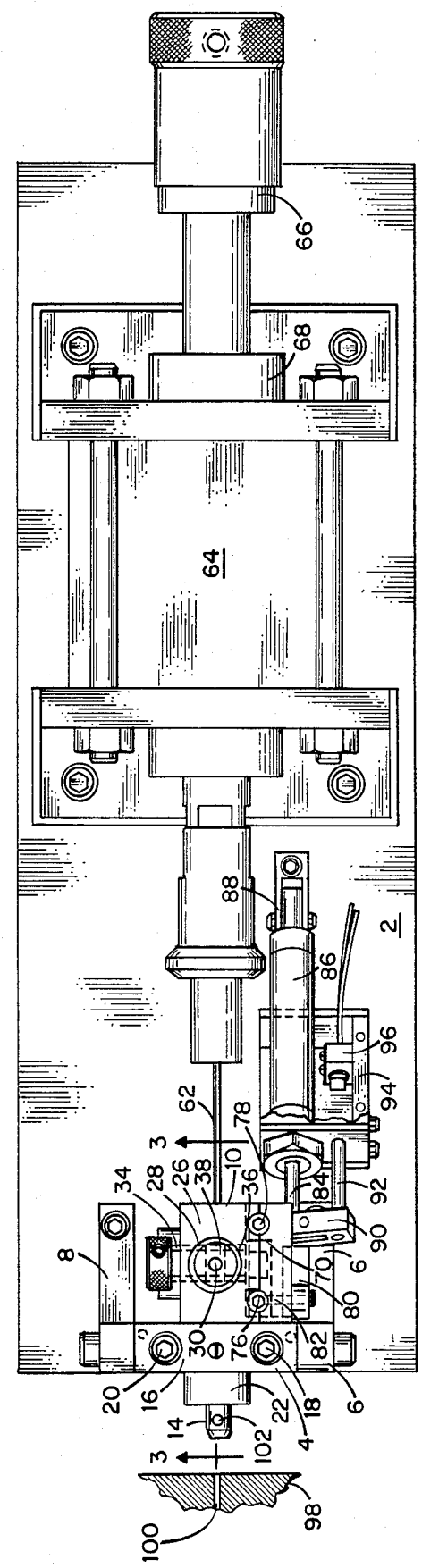

PIN INSERTING MACHINE

BACKGROUND OF THE INVENTION

Machines for inserting small pins in corresponding holes in work pieces are now in common use. According to the particular use requirements, the pins may be either solid cylindrical pins or spring pins. A spring pin is a small cylinder (usually of metal) of selected length and diameter, slit longitudinally so that it can be circumferentially compressed whereby it may be driven into a slightly smaller cylindrical hole.

For examples of machines for inserting small pins in work pieces, see the patents to White U.S. Pat. No. 3,982,679, Dodson et al U.S. Pat. No. 4,333,233 and Erskine U.S. Pat. No. 4,385,719. In the typical situation, the pins are fed vertically to a pin holder and then driven vertically downward into a vertical hole in a horizontally positioned work piece.

SUMMARY OF THE INVENTION

The machine of the present invention is designed to drive pins into holes in work pieces so positioned that the holes are at right angles to the original direction of feed of the spring pins. In the construction disclosed herein the pins are fed by gravity in a continuous succession through a vertical tube to be received one at a time in a pin receiving means (called a rotor). The rotor is then turned or rotated through 90° to place the pin horizontally in alignment with a horizontal pin driving punch.

Since the face of the pin receiving work piece is vertical and a substantial distance away from the rotatable pin receiving rotor, means are provided for supporting and directing the pin after it is driven horizontally out of the rotor by the punch until it reaches and is then driven into the selected horizontal hole in the work piece.

The pin supporting and directing means is preferably in the form of a slidable unit moved by the punch to a position against the work piece and, after the pin has been inserted, returned by spring means to a position adjacent the rotor.

Resilient stop means in the pin guide holds the pin stationary in the pin guide passage while the punch acting against the pin drives the pin guide forward until the work piece is engaged. Continued forward movement of the punch then forces the pin past the resilient stop means and on into the aligned hole.

The invention will be better understood as the description proceeds with the aid of the accompanying drawing in which FIG. 1 is a side elevation of the machine, FIG. 2 is a plan view of FIG. 1, FIG. 3 is a vertical section on the line 3—3 of FIG. 2 with a pin in vertical position within the rotor, FIG. 4 is a fragmentary side elevation of part of FIG. 1, after the rotor has been turned through 90°, FIG. 5 is a fragmentary vertical section similar to FIG. 3 in which the rotor has been turned through 90°, FIG. 6 is a view similar to FIG. 5 but with the punch advanced to a position to place the pin in engagement with the resilient stop means, FIG. 7 similar to FIGS. 5 and 6 shows the pin guide moved to a position against the work piece, FIG. 8, similar to FIGS. 5, 6 and 7 shows the pin driven past the resilient stop into the work piece by the punch, FIG. 9 similar to FIGS. 5, 6, 7 and 8 shows the punch withdrawn, the pin guide returned to its original position and the rotor turned back 90° with the next pin in place therein.

DESCRIPTION OF A PREFERRED EMBODIMENT

Figure 3:
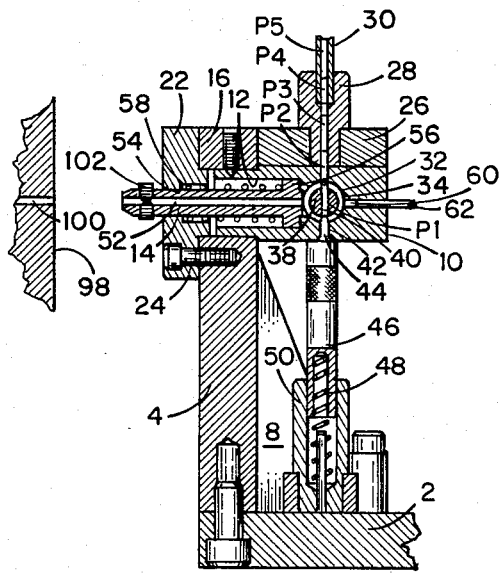

The overall machine is shown in FIGS. 1 and 2. It comprises a base plate 2 on which is mounted a vertical face plate 4 supported by side plates 6 and 8. Face plate 4 carries a horizontal member 10 bored at 12 to receive a sliding pin guide 14. Member 10 is clamped in horizontal position by cross piece 16 secured by screws 18 and 20 to face plate 4.

At the left end of member 10 is a vertical member 22 secured to face plate by screw 24 and bored to receive pin guide 14. Secured to the top of member 10 is plate 26 carrying a support 28 for pin feed tube 30. Adjacent the right end of bore 12 is a transverse horizontal bore 32 containing spaced bushings 34 and 36 (see FIG. 2) within which is rotor 38.

Rotor 38 has a single hole 40 therethrough which when in vertical position as shown in FIG. 3 is aligned with the pin feed tube 30. Directly below hole 40 is a vertical passage 42 in which is positioned a finger 44 long enough to engage the rotor and to prevent a pin in hole 40 from falling through. Finger 44 is mounted on the upper end of post 46 supported by compression spring 48 in socket 50.

As shown in FIG. 3, there are a plurality of gravity fed pins in pin feed tube 30. The first pin P1 is in hole 40 in rotor 38. The length of the pins P1, P2 etc. is greater than the diameter of the rotor but less than the rotor diameter plus the thickness of bushing 34. The lower end of pin P1 rests on the end of finger 44. The upper end of pin P1 is between the adjacent ends of bushings 34 and 36. Thus when the machine is put in operation, the extended upper end of pin P1 will not block rotation of rotor 38.

The sliding pin guide 14, cylindrical in form, has a longitudinal bore 52. It is supported for accurate longitudinal movement in a closely fitting bore 54 in member 22 and at its right end by a circular flange 56 fitting within bore 12. The pin guide 14 is constantly urged to the right by compression spring 58.

To the right of rotor 38 is a bore 60 in member 10 sized to receive punch 62 which is accurately aligned with bore 52 in pin guide 14. Punch 62 is operated by conventional means such as air cylinder 64 which, following alignment of hole 40 with bore 52, drives the punch 62 to the left the distance required to force the pin in the hole in the work piece and then withdraws the punch to the starting position shown in FIG. 3. The length of the stroke of punch 62 is controlled by the adjustable stop 66 which engages the air cylinder frame at 68.

Figure 4:
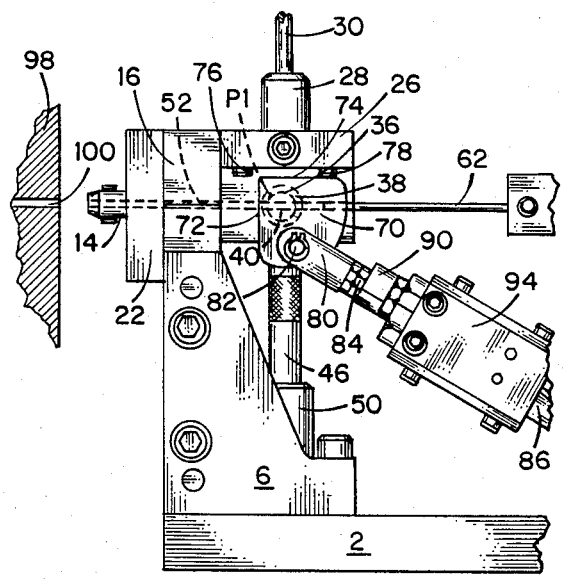

The means for turning rotor 38 through 90° to bring hole 40 and pin P1 into alignment with punch 62 operates as follows: As seen in FIGS. 1, 2 and 4, rotor 38 is secured at one end to a quadrant shaped plate 70 whereby rotation of plate 70 through 90° about the axis of rotor 38 will correspondingly turn hole 40 from vertical to horizontal. Plate 70 has two sides 72 and 74 at right angles to each other and adapted for engagement respectively with adjustable stops 76 and 78 whereby the hole 40 can be accurately aligned first with the pin feed tube 30 and secondly with bores 52 and 60.

Plate 70 is connected to link 80 by a short shaft 82 fixed in plate 70 and rotatable in link 80. Link 80 is affixed to the end of the piston rod 84 of air cylinder 86. Air cylinder 86 is pivotally mounted at 88 on base plate 2 to accommodate the non linear motion of link 80 as plate 70 is rotated.

A clamp 90 secured to piston rod 84 also holds another rod 92 in parallelism. Rod 92 extends into a control box 94 to actuate a suitable electric switch 96. This switch in turn causes operation of solenoid controlled valves to put air cylinder 64 into operation. All such controls are well understood in the art and need not be explained in detail herein.

OPERATION OF THE MACHINE

A work piece 98 containing one or more holes 100 is mounted in fixed relation to base 2. Hole 100 is aligned with the bore 52 of sliding pin guide 14.

Figure 5:
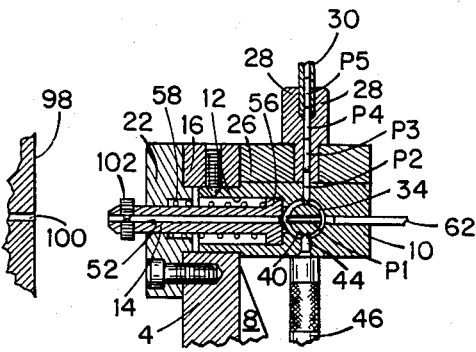

At the start of the cycle, pin P1 is in position in rotor 38 with pins P2, P3, P4, P5 etc. gravitationally resting in succession on each other in pin feed tube 30. The operator closes a suitably wired switch which puts air cylinder 86 in operation, driving the piston therein down to move plate 70 from the position in FIGS. 1 and 2 to that shown in FIG. 4. This rotates rotor 38 counter clockwise to the position shown in FIG. 5 in which hole 40 is aligned with punch 62 and bore 52.

Figure 6:
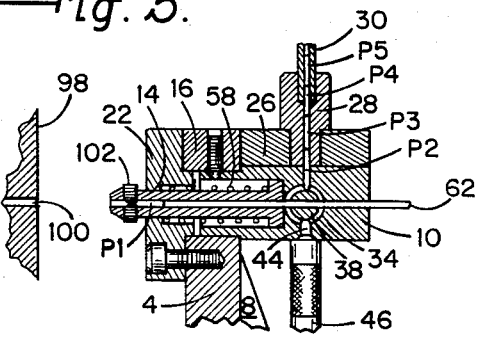

At the end of the downward stroke of piston rod 84, rod 92 engages switch 96 to put air cylinder 64 into operation to drive punch 62 to the left to enter hole 40 and push pin P1 to the left through pin guide tube 14 to the position shown in FIG. 6.

Figure 7:
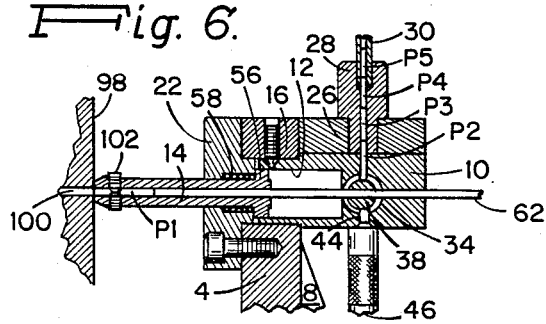
Figure 8:
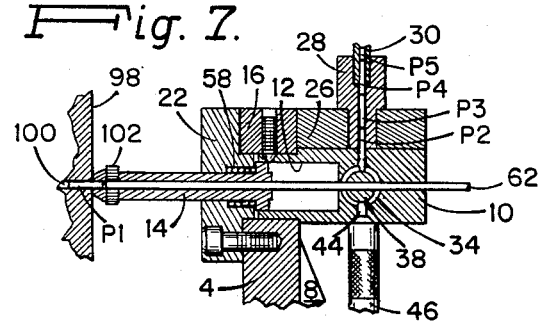
Figure 9:
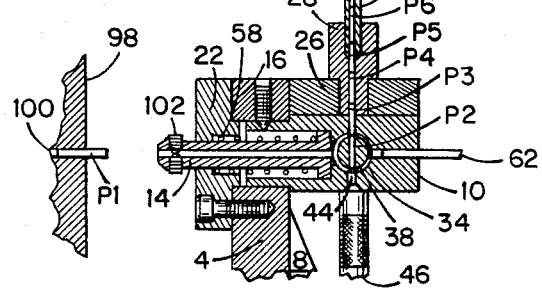

Pin P1 then encounters resilient stop means 102 which may take the form of two spring pressed balls engaging each other with sufficient force to prevent immediate passage of pin P1 thereby. Continued movement to the left of punch 62 then causes the pin guide tube 14 to move to the left, overcoming the resistance of spring 58 until the end of the guide tube 14 engages the face of work piece 98 as shown in FIG. 7. Punch 62, not having reached the end of its stroke, then is able to force pin P1 past the resilient stop 102 and on into hole 100 in work piece 98 as shown on FIG. 8.

Pin P1 will be driven by punch 62 into hole 100 in the work piece to a controlled depth according to the setting of stop 66. When punch 62 reaches the end of its stroke, the air valves controlled by a limit switch are automatically shifted and the punch is withdrawn to come to a halt in its original position shown in FIGS. 3 and 5.

As soon as the punch has withdrawn from rotor 38, the valve controlling flow of air into air cylinder 86 is reversed causing plate 70 to move from the position of FIG. 4 to that of FIGS. 1 and 2 thus to turn hole 40 in rotor 38 from horizontal to vertical and in alignment the pins in pin feed tube 30. Pin P2 instantly falls into hole 40 in the rotor to rest on finger 44. The following pins correspondingly fall the distance of one pin to be supported by pin P2.

The situation will then be the same as shown in FIG. 1, 2 and 3. As soon as another hole in the work piece has been aligned with the sliding pin guide 14, the operator starts the next cycle to repeat the aforesaid steps.

It will be noticed that finger 44 is readily removable from its pin supporting position below rotor 38. The purpose of this is to provide means for cleaning the rotor should a pin become jammed therein. Continuous feeding of pins to the pin feed tube is provided by automatic means in common use and which need not be further explained.

It is intended to cover all changes and modifications of the example of the invention herein chosen for purposes of the disclosure which do not constitute departures from the spirit and the scope of the invention.

I claim:

1. A machine for driving a pin into a horizontal hole in the vertical face of an adjacent work piece, said machine comprising a supporting body, a pin receiving rotor mounted for rotation on a horizontal axis in said body, a hole extending dimetrically through said rotor, means for feeding a succession of pins one at a time to said when in a vertical position, means for rotating said rotor 90° to place said hole and pin therein in a horizontal position, a horizontal pin guide slidingly mounted in said body at right angles to the axis of said rotor, spring means constantly urging said pin guide toward said rotor, said pin guide having a bore therethrough aligned with the hole in said rotor when said hole has been turned from the vertical position to the horizontal position with a pin therein, a horizontal punch for driving said pin from said horizontally positioned rotor hole into said pin guide bore while said pin guide is stationary, resilient stop means in said pin guide bore adapted to be engaged by and to temporarily stop movement of said pin through said bore as said pin is being advanced by said punch, said pin guide adapted to be advanced by said punch acting against the said pin then in engagement with said resilient stop means and simultaneously compressing said spring means until the said pin guide engages said work piece and whereby continued movement of said punch in said bore forces said pin past said resilient stop means and into said horizontal hole in said work piece.

2. A machine for inserting a pin in a horizontal hole in a work piece having a vertical face adjacent said machine, and a succession of pins supplied thereto said machine comprising a supporting body, a pin receiving rotor mounted in said body for rotation about a horizontal axis, a punch and a horizontally sliding pin guide mounted in said supporting body, a diametrically extending hole through said rotor, means for rotating said rotor to move said hole from a vertical position to a horizontal position, said pin guide being in the form of an elongated element having a longitudinal horizontal bore therethrough in alignment with said rotor hole when the latter is in the horizontal position, a resilient pin stop in said bore, said pin guide slidable horizontally in a cooperating bore in said body, spring means urging said pin guide to a position toward said rotor, a bore through said body on the opposite side of said rotor away from said pin guide aligned with the hole in said rotor when in the horizontal position and the bore through said pin guide, a horizontally movable punch positioned to pass through said body bore, said rotor hole and said pin guide bore, means for feeding a succession of end to end pins one at a time by gravity to the hole in said rotor when said hole is in the vertical position, means at the lower end of said rotor hole when said hole is in the vertical position to prevent further downward movement of a said pin through said hole, each said pin being slightly longer than the length of said hole, circumferential clearance in said body whereby said rotor can be turned 90° by said rotating means without interference with said pin to place said hole and pin therein in the horizontal position aligned with said punch and pin guide bore, means for driving said punch through said rotor when the hole therein is in the horizontal position and into said pin guide bore to move said pin to a position against said resilient pin stop and whereby, continued movement of said punch will act to move said pin guide out of said body until the end thereof engages the face of said work piece and whereby further continued movement of said punch against said pin will overcome said resilient pin stop and force said pin into the said hole in said work piece.

3. The machine set forth in claim 2, the means for rotating said rotor through 90° comprising a lever arm on the end of said rotor and an air actuated piston connected to said arm.

4. The machine set forth in claim 2, the next pin in said succession of pins following the preceding pin then in said rotor resting on the upper end of said preceding pin when said rotor hole is in the vertical position and resting on the periphery of said rotor when said rotor hole is in the horizontal position, whereby when said empty rotor hole is returned to the vertical position said next pin will fall therein and the next following pin will rest on the upper end of said next pin then in said rotor hole.

* * * * *